United States Patent
Saeki et al.

(10) Patent No.: US 10,256,045 B2
(45) Date of Patent: Apr. 9, 2019

(54) CAPACITOR

(71) Applicant: Murata Manufacturing Co., Ltd., Nagaokakyo-shi, Kyoto-fu (JP)

(72) Inventors: Hiromasa Saeki, Nagaokakyo (JP); Noriyuki Inoue, Nagaokakyo (JP); Takeo Arakawa, Nagaokakyo (JP); Naoki Iwaji, Nagaokakyo (JP)

(73) Assignee: MURATA MANUFACTURING CO., LTD., Nagaokakyo-shi, Kyoto-Fu (JP)

( * ) Notice: Subject to any disclaimer, the term of this patent is extended or adjusted under 35 U.S.C. 154(b) by 0 days.

(21) Appl. No.: 15/209,128

(22) Filed: Jul. 13, 2016

(65) Prior Publication Data

US 2016/0322171 A1 Nov. 3, 2016

Related U.S. Application Data

(63) Continuation of application No. PCT/JP2015/050526, filed on Jan. 9, 2015.

(30) Foreign Application Priority Data

Feb. 7, 2014 (JP) ................. 2014-022624

(51) Int. Cl.
| | |
|---|---|
| *H01G 9/032* | (2006.01) |
| *H01G 9/07* | (2006.01) |
| *H01G 9/00* | (2006.01) |
| *H01G 9/055* | (2006.01) |
| *H01G 9/15* | (2006.01) |
| *H01G 9/04* | (2006.01) |

(Continued)

(52) U.S. Cl.
CPC ............. *H01G 9/07* (2013.01); *H01G 9/0029* (2013.01); *H01G 9/0032* (2013.01); *H01G 9/032* (2013.01); *H01G 9/04* (2013.01); *H01G 9/045* (2013.01); *H01G 9/052* (2013.01); *H01G 9/055* (2013.01); *H01G 9/15* (2013.01)

(58) Field of Classification Search
CPC ........ H01G 4/008; H01G 4/005; H01G 4/012; H01G 9/15; H01G 9/032; H01G 9/055
See application file for complete search history.

(56) References Cited

U.S. PATENT DOCUMENTS

| | | |
|---|---|---|
| 7,105,401 B2 | 9/2006 | Lee et al. |
| 8,451,582 B2 | 5/2013 | Sneh et al. |
| 2003/0160276 A1 | 8/2003 | Lee et al. |

(Continued)

FOREIGN PATENT DOCUMENTS

| | | |
|---|---|---|
| CN | 1441496 A | 9/2003 |
| JP | H01-113328 U | 7/1989 |

(Continued)

OTHER PUBLICATIONS

International Search Report Issued for PCT/JP2015/050526, dated Apr. 14, 2015.

(Continued)

*Primary Examiner* — Nguyen T Ha
(74) *Attorney, Agent, or Firm* — Arent Fox LLP

(57) ABSTRACT

A capacitor that includes a porous metal base material, a first buffer layer formed by an atomic layer deposition method on the porous metal base material, a dielectric layer formed by an atomic layer deposition method on the first buffer layer, and an upper electrode formed on the dielectric layer.

21 Claims, 3 Drawing Sheets

(51) Int. Cl.
*H01G 9/045* (2006.01)
*H01G 9/052* (2006.01)

(56) References Cited

U.S. PATENT DOCUMENTS

| | | |
|---|---|---|
| 2005/0042836 A1 | 2/2005 | Lee et al. |
| 2006/0289921 A1 | 12/2006 | Lee et al. |
| 2007/0020923 A1 | 1/2007 | Kraus et al. |
| 2008/0094775 A1 | 4/2008 | Sneh et al. |
| 2008/0318378 A1* | 12/2008 | Wu .................. H01L 27/10852 438/253 |
| 2009/0122460 A1* | 5/2009 | Gschwandtner ....... H01G 4/008 361/305 |
| 2009/0273882 A1* | 11/2009 | Park ...................... H01G 4/008 361/305 |
| 2010/0123993 A1 | 5/2010 | Laor |
| 2011/0222209 A1* | 9/2011 | Ohyama ................ H01G 9/048 361/523 |
| 2011/0310526 A1 | 12/2011 | Sneh et al. |
| 2011/0310530 A1 | 12/2011 | Laor |
| 2012/0170173 A1 | 7/2012 | Oshima et al. |
| 2012/0186976 A1* | 7/2012 | Laucournet ......... H01M 4/8621 204/252 |
| 2013/0148266 A1* | 6/2013 | Hagiwara ................ H01G 9/02 361/518 |
| 2014/0036416 A1 | 2/2014 | Ishimoto et al. |

FOREIGN PATENT DOCUMENTS

| | | |
|---|---|---|
| JP | 2008507847 A | 3/2008 |
| JP | 2010-171256 A | 8/2010 |
| JP | 2011249488 A | 12/2011 |
| JP | 2012043960 A | 3/2012 |
| JP | 2012517717 A | 8/2012 |
| JP | 5294900 B2 | 9/2013 |
| WO | WO 2012157241 A1 | 11/2012 |

OTHER PUBLICATIONS

Written Opinion of the International Searching Authority issued for PCT/JP/2015/050526, dated Apr. 14, 2015.

* cited by examiner

FIG. 1
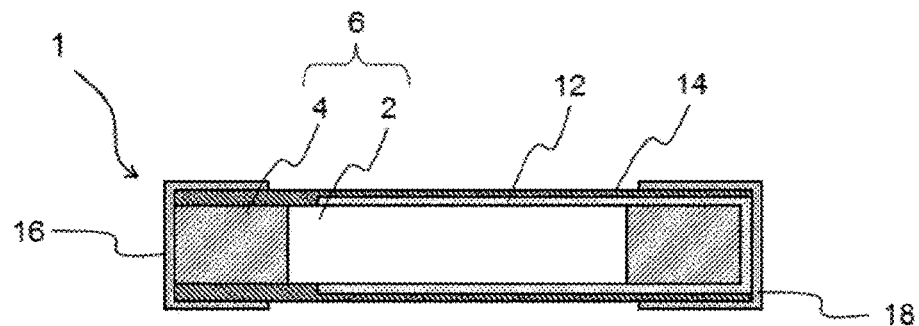
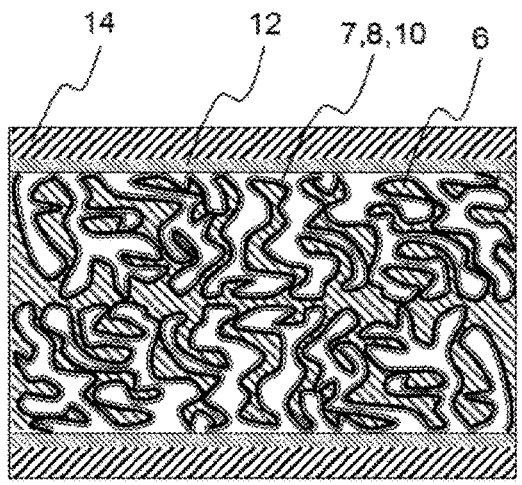
FIG. 2(a)
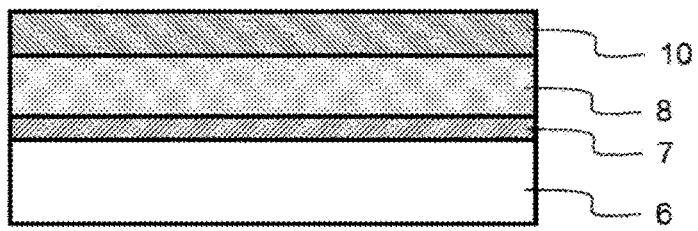
FIG. 2(b)
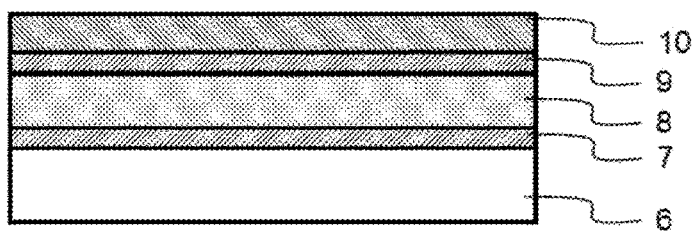
FIG. 2(c)

CAPACITOR

CROSS REFERENCE TO RELATED APPLICATIONS

The present application is a continuation of International application No. PCT/JP2015/050526, filed Jan. 9, 2015, which claims priority to Japanese Patent Application No. 2014-022624, filed Feb. 7, 2014, the entire contents of each of which are incorporated herein by reference.

FIELD OF THE INVENTION

The present invention relates to a capacitor and a manufacturing method therefor.

BACKGROUND OF THE INVENTION

In recent years, with higher-density mounting of electronic devices, capacitors with higher electrostatic capacitance have been required. As such a capacitor, for example, Patent Document 1 discloses a capacitor that has a conformal and uniform dielectric layer on etched metal foil, and a conformal and uniform conductive layer on the dielectric layer.

Patent Document 1: Japanese Translation of PCT Publication No. 2008-507847

SUMMARY OF THE INVENTION

Aluminum electrolytic capacitors have a dielectric film formed on a base material for providing electrostatic capacitance as a capacitor. Although porous metal base materials are sometimes used as the base material for achieving high electrostatic capacitance, the surface of the porous metal base material has various impurities attributed to the process for producing the porous metal base materials, and the materials fail to have a clean surface like planar substrates such as Si substrates. In addition, the impurities are extremely difficult to remove because the surface of the porous metal base materials is not smooth and has a complex shape.

The inventors have found that while the surface of a porous metal base material needs to be coated with a dielectric layer in the preparation of a capacitor, there is a possibility that the presence of any impurity on the surface of the base material will cause, under the influence thereof, problems such as an increase in leakage current, thereby failing to achieve the function as a capacitor.

In the case of coating the surface of a metal base material directly with a dielectric layer as with the capacitor described in Patent Document 1 mentioned above, there is a possibility of degrading the performance and reliability of the capacitor, such as an increase in leakage current, under the influence of such impurities. In particular, in the case of using a porous metal base material, this influence is significant.

An object of the present invention is to provide a highly reliable capacitor which is unlikely to be affected by impurities on the surface of a porous metal base material, and small in leakage current.

The inventors have found, as a result of earnest studies carried out in order to solve the problems mentioned above, that forming a buffer layer by an atomic layer deposition method (ALD method) on a porous metal base material, and then forming a dielectric layer by the ALD method on the buffer layer can reduce the influence of impurities present on the surface of the porous metal base material, thereby providing a capacitor which has excellent characteristics.

According to a first aspect of the present invention, a capacitor is provided which includes a porous metal base material; a first buffer layer formed by an atomic layer deposition method on the porous metal base material; a dielectric layer formed by an atomic layer deposition method on the first buffer layer; and an upper electrode formed on the dielectric layer.

According to a second aspect of the present invention, a method for manufacturing a capacitor is provided which includes forming a first buffer layer by an atomic layer deposition method on a porous metal base material; forming a dielectric layer by an atomic layer deposition method on the first buffer layer; and forming an upper electrode on the dielectric layer.

According to the present invention, providing the buffer layer between the porous metal base material and the dielectric layer and forming the dielectric layer and the buffer layer by an ALD method provide a highly reliable capacitor which is unlikely to be affected by impurities on the surface of the porous metal base material, and small in leakage current.

BRIEF EXPLANATION OF THE DRAWINGS

FIG. 1 is a schematic cross-sectional view of a capacitor according to an embodiment of the present invention.

FIG. 2(a) is an enlarged view of a high-porosity part of the capacitor in FIG. 1; FIG. 2(b) is a diagram schematically illustrating a layered structure in the high-porosity part; and FIG. 2(c) is a diagram schematically illustrating a layered structure according to another aspect.

FIGS. 3-2(e) to 3-2(h) are, following FIGS. 3-1(a) to 3-1(d), diagrams illustrating steps of manufacturing the capacitor in FIG. 1.

FIGS. 3-3(i) to 3-3(k) are, following FIG. 3-2(e) to 3-2(h), diagrams illustrating steps of manufacturing the capacitor in FIG. 1.

DETAILED DESCRIPTION OF THE INVENTION

Figures 1A, 3:
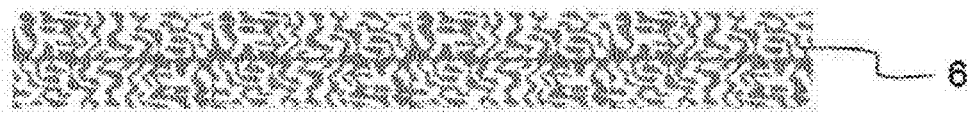
FIGS. 3-1(a) to 3-1(d) are diagrams illustrating steps of manufacturing the capacitor in FIG. 1.

A capacitor according to the present invention will be described in detail below with reference to the drawings. However, the capacitor according to the present embodiment and the shapes and arrangement of respective constructional elements are not limited to those in the examples shown in the figures.

FIG. 1 shows therein a schematic cross-sectional view of a capacitor 1 according to the present embodiment (a first buffer layer 7, a dielectric layer 8, and an upper electrode 10 are not shown therein), FIG. 2(a) shows therein an enlarged view of a high-porosity part of the capacitor 1, and FIG. 2(b) schematically shows therein the layered structure of the high-porosity part (that is, the layered structure of a porous metal base material 6, the first buffer layer 7, the dielectric layer 8, and the upper electrode 10). As shown in FIG. 1 and FIGS. 2(a) and 2(b), the capacitor 1 according to the present embodiment has a substantially cuboid shape, and mainly has the porous metal base material 6 including a high-porosity part 2 in the center thereof and low-porosity parts 4 at the side surface parts thereof, the first buffer layer 7 formed thereon, the dielectric layer 8 formed on the first buffer layer 7, the upper electrode 10 formed on the dielectric layer 8, a wiring electrode 12 formed thereon to be electrically connected to the upper electrode 10, and further a protective layer 14 formed thereon. On side surfaces of the porous metal base material 6, a first terminal electrode 16 and a second terminal electrode 18 are provided to be opposed, and the first terminal electrode 16 is electrically connected to the porous metal base material 6, whereas the second terminal electrode 18 is electrically connected to the upper electrode 10 through the wiring electrode 12.

In this specification, the "porosity" of the porous metal base material refers to the proportion of voids in the porous metal base material. The porosity can be measured in the following way.

First, the porous metal base material is processed by focused ion beam (FIB: Focused Ion Beam) processing into a thin section of 60 nm or less in thickness. A predetermined region (5 μm×5 μm) of this thin section sample is photographed with the use of a transmission electron microscope (TEM: Transmission Electron Microscope). The obtained image is subjected to image analysis, thereby finding the area where a metal of the porous metal base material is present. Then, the porosity can be calculated from the following equality.

Porosity=(Measured Area−Area where Metal of Base Material is Present)/Measured Area In this specification, the "high-porosity part" of the porous metal base material refers to a region where the porosity is 25% or more.

In this specification, the "low-porosity part" of the porous metal base material refers to a site where the porosity is low as compared with the high-porosity part, specifically, a region that is 70% or less of the high-porosity part in terms of porosity.

In this specification, the "side surface" of the porous metal base material refers to a surface substantially perpendicular to the mounting surface of the capacitor. It is to be noted that the lower surface is considered as the mounting surface of the capacitor in FIGS. 1 to 3-3(*k*).

The metal constituting the porous metal base material mentioned above is not particularly limited as long as the metal is conductive, but examples thereof include metals such as aluminum, tantalum, nickel, copper, titanium, niobium, and iron, and alloys such as stainless steel and duralumin.

Preferred porous metal base materials, which are not to be considered particularly limited, include aluminum etching foil, a sintered body of tantalum powder, a sintered body of nickel powder, and porous metals synthesized by a dealloying method.

The porous metal base material can be prepared by a method well known in the art, such as etching, sintering, and dealloying methods. In addition, a commercially available porous metal base material may be used for the porous metal base material. It is to be noted that the porous metal base material may have a natural oxide film or natural hydroxide film of 10 nm or less.

The thickness of the porous metal base material is not particularly limited, but can be appropriately selected for any purpose, and may be, for example, 10 to 1000 μm, preferably 30 to 300 μm. It is to be noted that the thickness of the porous metal base material refers to a length in a direction perpendicular to the mounting surface of the capacitor.

As shown in FIG. 1, the porous metal base material 6 has, at the pair of opposed side surface parts thereof, the low-porosity parts 4, and the high-porosity part 2 therebetween.

The porosity of the high-porosity part of the porous metal base material is preferably 30% or more, and more preferably 35% or more, from the perspective of increasing the surface area to increase the capacitance of the capacitor. In addition, the porosity is preferably 80% or less, and more preferably 65% or less, from the perspective of ensuring mechanical strength.

An expanded surface ratio of the high-porosity part of the porous metal base material is not particularly limited, but preferably 30 to 10,000 times, more preferably 50 to 5,000 times, for example, 300 to 600 times. The expanded surface ratio refers to the ratio of the surface area to the projected area of the porous metal.

The low-porosity parts of the porous metal base material contribute to enhanced mechanical strength of the capacitor. The porosity of the low-porosity part is preferably 60% or less of the porosity of the high-porosity part, and more preferably 50% or less of the porosity of the high-porosity part, from the perspective of increasing the mechanical strength. For example, the porosity of the low-porosity part is preferably 20% or less, and more preferably 10% or less. In addition, the low-porosity parts may have a porosity of 0%.

The low-porosity parts are 3 μm to 1 mm, preferably 10 to 500 μm in width (the length from a side surface in common with the side surface of the porous metal base material to a surface opposed to the side surface; the horizontal length on the drawing plane in FIGS. 1 to 3-3(*k*)). The low-porosity part made 3 μm or more, preferably 10 μm or more in width can increase the mechanical strength of the capacitor. In addition, the low-porosity part made 1 mm or less in width makes it possible to ensure a larger high-porosity part in an equal volume of porous metal member, thereby making it possible to achieve high electrostatic capacitance. The thickness of the low-porosity part (the length in a direction perpendicular to the mounting surface of the capacitor) is 50% or more of the thickness of the porous metal base material, preferably equal to that of the porous metal base material (that is, the overall thickness of the porous metal base material), for increasing the mechanical strength of the capacitor.

The method for forming the low-porosity parts is not particularly limited as long as a desired porosity can be achieved, but the low-porosity parts are preferably formed, for example, by pressing with a mold or the like. The pressing may be carried out in such a way that the porous metal base material is subjected to pressing so as to be sandwiched from the upper and lower surfaces of the porous metal base material, or subjected to pressing from only one of the surfaces.

Alternatively, as another method, a porous metal base material made porous in advance may be irradiated with a $CO_2$ laser, a YAG laser, an excimer laser, and an all-solid-state pulsed laser such as a femtosecond laser, a picosecond laser, and a nanosecond laser, to fill pores, thereby forming low-porosity parts. All-solid-state pulsed lasers such as a femtosecond laser, a picosecond laser, and a nanosecond laser are preferred, because the shape and porosity of the low-porosity parts can be controlled with more precision.

The low-porosity parts may be formed by filling pores of the high-porosity part as mentioned above, but can be also formed in the process of forming pores in a metal base material that is not made porous. For example, in the case of preparing porous metal foil by etching, sites where low-porosity parts are to be formed are subjected to masking, and then etching, thereby causing the masked sites to serve as non-etched layers, and thus forming the low-porosity parts.

Alternatively, in the case of forming a low-porosity part in a central part of foil, etching is stopped before pores are formed in the central part of the foil, thereby causing the central part to serve as a non-etched layer, and thus forming the low-porosity part.

Low-porosity parts in various shapes can be formed by combining the pressing, laser processing, and formation of non-etching layers as mentioned above.

It is to be noted that while the capacitor 1 according to the present embodiment has low-porosity parts at both of the side surface parts, the low-porosity parts are not essential elements although it is more preferable to dispose the parts for increasing the strength. In addition, where low-porosity part is located is not particularly limited.

In the capacitor 1, the first buffer layer 7 is formed on the porous metal base material 6 described above.

The material constituting the first buffer layer is not particularly limited as long as the material is conductive, but examples thereof include conductive nitrides or oxynitrides represented by $MO_xN_y$ (M=Ti, Al, Cr, Ga, W, Zr, Nb, Ta, Hf, or the like, $x \geq 0$, $y > 0$); and metals such as Al, Ti, Cr, Cu, W, Ni, Zr, and Ta. The use of the material as mentioned above can suppress the diffusion of impurities into the dielectric film through anion vacancies, and achieve a favorable insulating property. In addition, the equivalent series resistance (ESR: Equivalent Series Resistance) of the capacitor can be reduced.

In a preferred embodiment of the present invention, the material constituting the first buffer layer may be a nitride or an oxynitride. The use of the nitride or oxynitride can improve the adhesion between the layers, and further also improve the chemical resistance.

In another preferred embodiment of the present invention, the material constituting the first buffer layer may be a metal. The use of the metal can make the resistance of the buffer layer typically lower than that of the nitride or oxynitride, thereby making it possible to reduce the ESR of the capacitor. Reducing the ESR of the capacitor improves filter characteristics, reduces heat generation, and improves further high-frequency characteristics.

The first buffer layer may have one layer, or two or more layers. When there are two or more first buffer layers, the respective layers may be composed of the same material, or composed of different materials.

The thickness of the first buffer layer (the total in the case of two or more layers) is not particularly limited, but is preferably 0.5 to 20 nm, more preferably 1.0 to 10 nm. The thickness of the first buffer layer, which is made 0.5 nm or more, can further reliably prevent the diffusion of impurities on the porous metal surface into the dielectric layer. The thickness of the first buffer layer, which is made 20 nm or less, can suppress the decrease in the surface area of the porous metal base material due to vacancies filled with the first buffer layer, and suppress the increase in ESR.

In the capacitor 1, the dielectric layer 8 is formed on the first buffer layer 7.

The material that forms the dielectric layer mentioned above is not particularly limited as long as the material has an insulating property, but examples thereof preferably include metal oxides such as $AlO_x$ (e.g., $Al_2O_3$), $SiO_x$ (e.g., $SiO_2$), $AlTiO_x$, $SiTiO_x$, $HfO_x$, $TaO_x$, $ZrO_x$, $HfSiO_x$, $ZrSiO_x$, $TiZrO_x$, $TiZrWO_x$, $TiO_x$, $SrTiO_x$, $PbTiO_x$, $BaTiO_x$, $BaSrTiO_x$, $BaCaTiO_x$, and $SiAlO_x$; metal nitrides such as $AlN_x$, $SiN_x$, and $AlScN_x$; or metal oxynitrides such as $AlO_xN_y$, $SiO_xN_y$, $HfSiO_xN_y$, and $SiC_xO_yN_z$, and $AlO_x$, $SiO_x$, $SiO_xN_y$, and $HfSiO_x$ are preferred. It is to be noted that the formulas mentioned above are merely intended to represent the constitutions of the materials, but not intended to limit the compositions. More specifically, the x, y, and z attached to O and N may have any value, and the respective elements including the metal elements may have any presence proportion.

The thickness of the dielectric layer is not particularly limited, but for example, preferably 5 to 100 nm, and more preferably 10 to 50 nm. The thickness of the dielectric layer, which is made 5 nm or more, can enhance the insulating property, thereby making it possible to reduce leakage current. In addition, the thickness of the dielectric layer, which is made 100 nm or less, makes it possible to obtain higher electrostatic capacitance.

The first buffer layer and the dielectric layer are formed by an ALD method. The ALD method forms a film by depositing atomic layers one by one with a reaction gas including raw material atoms, and thus can form a remarkably homogeneous and dense film even in deep microscopic regions of pores of the porous metal base material. The formation, by the ALD method, of the first buffer layer which is homogeneous and dense even in fine pores of the porous metal member and the formation of the dielectric layer thereon can suppress the diffusion of impurities on the porous metal base material into the dielectric layer, and further make it possible to obtain an extremely thin layer which has high adhesion. In addition, the dielectric layer formed by the ALD method is extremely thin, homogeneous and dense, and can be thus considered as a highly insulating film which undergoes a decrease in leakage current. Accordingly, it becomes possible to achieve a capacitor which has remarkably stable characteristics, a low short-circuit percentage, and high capacitance. It is to be noted that the film formed by the ALD method is mainly amorphous, the composition thereof is thus not limited to the stoichiometric proportions, but the film can be composed in accordance with various compositional proportions.

In the capacitor 1, the upper electrode 10 is formed on the dielectric layer 8.

The material constituting the upper electrode is not particularly limited as long as the material is conductive, but examples thereof include Ni, Cu, Al, W, Ti, Ag, Au, Pt, Zn, Sn, Pb, Fe, Cr, Mo, Ru, Pd, and Ta and alloy layers thereof, e.g., CuNi, AuNi, AuSn, and metal oxides and metal oxynitrides such as TiN, TiAlN, TiON, TiAlON, TaN, and TiN and TiON are preferred.

The thickness of the upper electrode is not particularly limited, but for example, preferably 3 nm or more, and more preferably 10 nm or more. The thickness of the upper electrode, which is made 3 nm or more, can reduce the resistance of the upper electrode itself.

The upper electrode can be formed by an ALD method. The use of the ALD method can further increase the capacitance of the capacitor. The upper electrode may be formed by, as another method, a method such as a chemical vapor deposition (CVD: Chemical Vapor Deposition) method, plating, bias sputtering, Sol-Gel, or an electrically conductive polymer filling, which can coat the dielectric layer, and substantially fill pores of the porous metal base material. Preferably, a conductive film may be formed by the ALD method on the dielectric layer, and pores may be filled thereon by other approach with a conductive substance, preferably a substance that is lower in electrical resistance, thereby forming the upper electrode. This constitution can efficiently achieve a higher capacitance density and low ESR.

It is to be noted that when the upper electrode fails to have sufficient conductivity as a capacitor electrode after the formation of the upper electrode, an extended electrode layer of Al, Cu, Ni, or the like may be additionally formed on the surface of the upper electrode by a method such as sputtering, vapor deposition, or plating.

In a preferred embodiment of the present invention, as shown in FIG. 2(c), a second buffer layer 9 may be formed by an ALD method on the dielectric layer 8, and the upper electrode 10 may be then formed thereon. providing the second buffer layer between the dielectric layer and the upper electrode can achieve effects such as the prevention of interdiffusion between the dielectric layer and the upper electrode, the reduced thickness of a dead layer (a part of the dielectric layer which substantially fails to function as a dielectric), improved adhesion, and improved moisture resistance of the dielectric layer. Further, stress can be reduced which is applied to the dielectric layer when the upper electrode is formed.

Examples of the material constituting the second buffer layer include the same material as that of the first buffer layer. It is to be noted that the material constituting the second buffer layer may be the same as or different from that of the first buffer layer.

As in the case of the first buffer layer, the use of a nitride or an oxynitride as the material constituting the second buffer layer can improve the adhesion between the layers, and further also improve the chemical resistance. In addition, the use of a metal can reduce the resistance of the buffer layer, thereby making it possible to reduce the ESR as a capacitor.

The second buffer layer may have one layer, or two or more layers. When there are two or more second buffer layers, the respective layers may be composed of the same material, or composed of different materials.

The thickness of the second buffer layer (the total in the case of two or more layers) is not particularly limited, but is preferably 0.5 to 20 nm, more preferably 1.0 to 10 nm. The thickness of the second buffer layer, which is made 0.5 nm or more, can further reliably prevent interdiffusion between the dielectric layer and the upper electrode. In addition, the thickness of the second buffer layer, which is made 20 nm or less, can suppress the decrease in the surface area of the porous metal base material due to vacancies filled with the second buffer layer, and suppress the increase in ESR.

In the capacitor 1, the wiring electrode 12 is formed on the upper electrode 10.

The material constituting the wiring electrode is not particularly limited, but examples thereof include metals such as Al, Cu, Ni, Sn, Ag, and Au, and alloys and intermetallic compounds thereof. The method for forming the wiring electrode is not particularly limited, but for example, a CVD method, plating, sputtering, baking of a conductive paste, and the like can be used.

In the capacitor 1, the protective layer 14 protects the porous metal base material with the first buffer layer 7, dielectric layer 8, upper electrode 10, and wiring electrode 12, and if any, second buffer layer 9 formed.

Preferably, the protective layer 14 is formed to cover the entire porous metal base material mentioned above, except for parts connected to the terminal electrodes. The protective layer can further enhance the moisture resistance, insulating property, and mechanical strength of the capacitor.

The material constituting the protective layer is not particularly limited as long as the material has an insulating property, but for example, the same material as that for forming the dielectric layer, preferably $SiN_x$, $SiO_x$, $AlTiO_x$, and $AlO_x$, more preferably $SiO_x$, or a resin coating such as polyepoxy or polyimide, or a glass coating can be used.

The thickness of the protective layer is not particularly limited as long as the thickness can achieve a desired function, for example, moisture resistance or an insulating property, but for example, 0.5 μm to 50 μm, and preferably 1 μm to 20 μm.

The method for forming the protective layer is not particularly limited, but can be appropriately selected depending on the material, such as, for example, a CVD method, plating, sputtering, spraying, screen printing, a dispenser, or resin film laminating.

The capacitor 1 has, at side surfaces thereof, the pair of first terminal electrode 16 and second terminal electrode 18 opposed.

The first terminal electrode 16 is electrically connected to the porous metal base material 6, the second terminal electrode 18 is electrically connected to the upper electrode 10, and the first terminal electrode and the second terminal electrode are disposed to be electrically insulated in the capacitor.

The materials constituting the first terminal electrode and the second terminal electrode (hereinafter, also referred to collectively as "terminal electrodes") are not particularly limited as long as the materials are conductive, but for example, metals such as Cu, Ni, Sn, Au, Ag, and Pb and alloys thereof can be used.

The thicknesses of the terminal electrodes are not particularly limited, but may be 1 to 50 μm, and preferably 1 to 20 μm.

The method for forming the terminal electrodes is not particularly limited, but the electrodes may be formed by, for example, plating, or formed by applying and baking a conductive paste.

This type of capacitor can, because the first buffer layer is formed by an ALD method between the porous metal base material and the dielectric layer, prevent the diffusion of impurities on the porous metal base material into the dielectric layer and interdiffusion between the porous metal base material and the dielectric layer, and reduce the thickness of the dead layer. Furthermore, the first buffer layer is remarkably homogeneous because of the ALD method, and thus capable of completely coating the porous metal surface from the vicinity of a surface layer of the porous metal substrate to deep pores thereof, and can effectively prevent the impurities and interdiffusion. As mentioned above, the capacitor according to the present invention can prevent the diffusion of impurities on the porous metal base material, thus even a porous metal base material having a high concentration of impurities which is usually not suitable for capacitor applications can be used as a capacitor. In addition, in a preferred embodiment, the second buffer layer is further formed by an ALD method between the dielectric layer and the upper electrode. Thus, interdiffusion between the dielectric layer and the upper electrode can be prevented, the thickness of the dead layer can be reduced, and the adhesion between the layers can be enhanced.

The capacitor according to the present invention can be manufactured by a method that includes forming a first buffer layer by an atomic layer deposition method on a porous metal base material; forming a dielectric layer by an atomic layer deposition method on the first buffer layer, and forming an upper electrode on the dielectric layer.

A process for manufacturing the above-described capacitor 1 according to the present embodiment will be specifically described below.

As shown in FIG. 3-1(a), the porous metal base material 6 is first prepared. As mentioned above, the porous metal base material can be prepared by a method well known in the art, such as etching, sintering, and a dealloying method. In addition, a commercially available porous metal base material may be used for the porous metal base material.

Figures 1B, 3:

Next, as shown in FIG. 3-1(b), the low-porosity parts 4 are formed for the porous metal base material 6. One porous metal base material has more than one low-porosity part formed at an interval depending on the size of a desired capacitor. More specifically, more than one element is formed from the porous metal base material. The low-porosity parts can be formed as described above by, for example, pressing with a mold or the like, or a $CO_2$ layer, a YAG laser, an excimer laser, and an all-solid-state pulsed laser such as a femtosecond laser, a picosecond laser, and a nanosecond laser.

Figures 1C, 3:
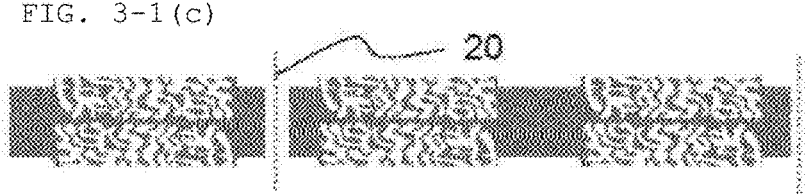

Next, as shown in FIG. 3-1(c), the porous metal base material is cut along a dashed line 20 in the low-porosity part (preferably, in a substantially central part thereof). However, at this point, the porous metal base material is not completely cut into element units, but kept with one side surface coupled to the adjacent element.

The method for cutting the porous metal base material is not particularly limited, but, the material can be cut by a single one or combination of, for example, a laser, punching through a mold, cutting with a dicer, a carbide blade, a slitter, or a pinnacle blade.

The manufacture of the capacitor according to the present invention includes a step of cutting the porous metal base material as mentioned above. In general, the presence of a porous site causes, in the cutting, the generation of shear drop, such as burr and/or drawing/deformation in the cutting direction along the cut surface. However, the method for manufacturing a capacitor according to the present invention makes it possible to suppress the generation of such burr, because the part to be cut is the low-porosity part.

Figures 1D, 3:
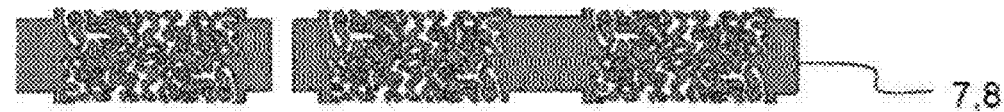

Next, as shown in FIG. 3-1(d), the first buffer layer 7 is formed by an ALD method on the surface of the porous metal base material 6 (entirely on the exposed surface of the porous metal substrate in the example shown), and the dielectric layer 8 is then formed by an ALD method on the first buffer layer 7. It is to be noted that while the first buffer layer 7 and the dielectric layer 8 are shown as if they constitute one layer for the sake of simplification in FIGS. 3-1(d), a layered structure is provided in practice where the dielectric layer 8 is formed on the first buffer layer 7.

Figures 2E, 3:
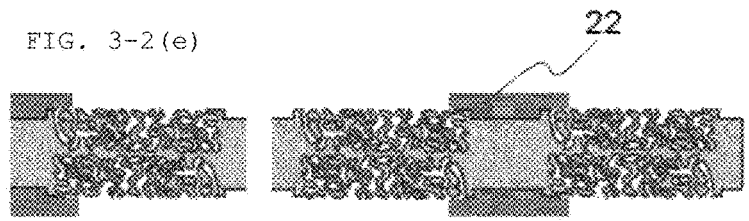

Next, as shown in FIG. 3-2(e), a mask 22 is formed on a part of the porous metal base material with the dielectric layer 8 formed, specifically on a site on which the first terminal electrode 16 is to be formed later.

The material constituting the mask is not particularly limited, but examples thereof include epoxy resins, polyimide resins, and silicone resins.

The method for forming the mask is not particularly limited, but examples thereof include screen printing, a dispenser, dipping, ink-jet printing, and spraying.

Figures 2F, 3:
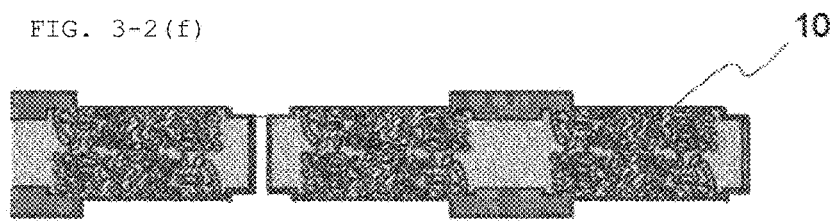

Next, as shown in FIG. 3-2(f), the upper electrode 10 is formed on the dielectric layer 8. In the example shown, as exemplified in FIG. 2(b), a conductive substance layer to serve as the upper electrode is formed so as to cover the entire element, and the upper electrode also serves as the wiring electrode 12.

The upper electrode can be formed by a method such as an ALD method, a CVD method, plating, bias sputtering, Sol-Gel, or electrically conductive polymer filling. In addition, these methods can be used in combination. For example, a conductive film may be formed by an ALD method on the dielectric layer, and pores may be filled thereon by other method, thereby forming the upper electrode.

In a preferred embodiment, a second buffer layer may be formed by an ALD method on the dielectric layer 8, and the upper electrode 10 may be then formed on the second buffer layer.

Figures 2G, 3:
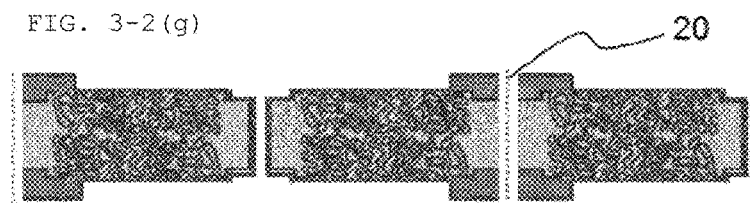

Next, as shown in FIG. 3-2(g), the porous metal base material is cut in the low-porosity part with the mask formed (preferably in a substantially central part thereof), and divided into respective element units. As a method for the cutting, the same method as for the cutting in FIG. 3-1(c) can be used.

Figures 2H, 3:

Next, as shown in FIG. 3-2(h), the mask is removed. The mask can be removed by an appropriate method depending on the material constituting the mask, etc., and removed by, for example, cleaning or heat treatment.

Figures 3, 3I:
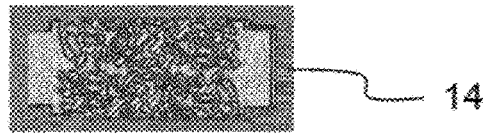

Next, as shown in FIG. 3-3(i), the protective layer 14 is formed so as to cover the entire element. As mentioned above, the protective layer can be formed by, for example, a CVD method, plating, sputtering, spraying, or printing.

Figures 3, 3J:
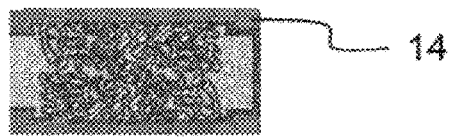

Next, as shown in FIG. 3-3(j), a part of the protective layer, specifically, sites on which the terminal electrodes are to be formed are etched to expose the porous metal base material 6 (the left side surface in the figure) and the upper electrode 10 (the right side surface in the figure).

Figures 3, 3K:
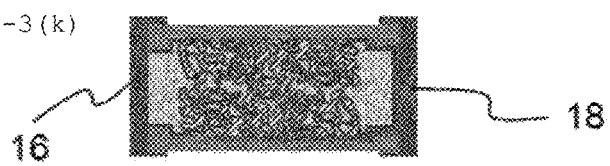

Finally, as shown in FIG. 3-3(k), the first terminal electrode 16 and the second terminal electrode 18 are formed. The first terminal electrode 16 is formed so as to be electrically connected to the porous metal base material 6, and electrically isolated from the upper electrode 10. The second terminal electrode 18 is formed so as to be electrically connected to the upper electrode 10, and electrically isolated from the porous metal base material 6. The terminal electrodes may be formed as mentioned above by plating, or formed by applying and baking or curing a conductive paste.

While the capacitor and manufacturing method therefor according to the present invention have been described above with reference to the capacitor 1 according to the embodiment, the present invention is not to be considered limited thereto, but various modifications can be made.

EXAMPLES

Example 1

Prepared as the porous metal base material was commercially available aluminum etching foil for aluminum electrolytic capacitor with a thickness of 110 μm and an expanded surface ratio of approximately 400 times (FIG. 3-1(a)). This aluminum etching foil was subjected to pressing from the top and bottom of the foil, thereby forming a low-porosity part (FIG. 3-1(b)).

Of the low-porosity part formed as described above, a part to serve as one side surface of a capacitor was cut by a laser (FIG. 3-1(c)). After the cutting, the foil was cut into a predetermined size, a first buffer layer composed of TiON of 3 nm in thickness was formed by an ALD method, and a dielectric layer of 30 nm $AlO_x$ (x is 1.2 or more) was then formed at 300° C. by an ALD method (FIG. 3-1(d)).

Next, a mask was applied to the top and bottom of the low-porosity part not subjected to the foregoing cutting (FIG. 3-2(e)), and a TiN film of 30 nm in thickness to serve as an upper electrode was formed by an ALD method on the dielectric layer formed above, and pores were then filled with Ni to form a wiring electrode (FIG. 3-2(f)).

Next, the low-porosity part coated with the mask was cut (FIG. 3-2(g)). Then, the mask was removed by heat treatment at a high temperature (FIG. 3-2(h)).

Next, a protective layer of $SiO_2$ was formed by a CVD method such that the entire surface of the chip was covered with a thickness of 2 µm on average (FIG. 3-3(i)). Then, the protective layer on both ends of the element was etched with a fluorine-based gas (FIG. 3-3(j)), and terminal electrodes of Ni of 5 µm in thickness were formed by plating thereon, and Sn of 3 µm was formed by plating thereon (FIG. 3-3(k)). In this way, the film structure as shown in FIG. 2(b), that is, the capacitor in a chip form (length (L)=approximately 1.6 mm, width (W)=approximately 0.8 mm, thickness (T)=approximately 0.15 mm) was prepared where the first buffer layer (TiON), the dielectric layer ($AlO_x$), and the upper electrode layer (TiN) were formed sequentially on the porous metal base material (aluminum etching foil). This capacitor was approximately 1 µF in electrostatic capacitance.

Example 2

In the same way as in Example 1 except that the porous metal substrate, the first buffer layer, the dielectric layer, and the upper electrode were made to have the following compositions, a film structure as shown in FIG. 2(b), that is, a capacitor in a chip form (length (L)=approximately 3.2 mm, width (W)=approximately 1.6 mm, thickness (T)=approximately 0.5 mm) was prepared where the first buffer layer (Ni), the dielectric layer ($SiN_x$), and the upper electrode (Ni) were formed sequentially on the porous metal base material (Ta porous sintered body).

Porous Metal Substrate: Ta porous sintered substrate with an expanded surface ratio of approximately 500 times First Buffer Layer: 10 nm Ni film formed by an ALD method Dielectric Layer: 10 nm $SiN_x$ (x is 1.0 or more) film formed by an ALD method at 250° C.

Upper Electrode: 50 nm Ni layer formed by an ALD method

Example 3

In the same way as in Example 1 except that the porous metal substrate, the first buffer layer, the dielectric layer, and the upper electrode were made to have the following compositions, and further except that a second buffer was formed by an ALD method on the dielectric layer, and the upper electrode was formed thereon, a film structure as shown in FIG. 2(c), that is, a capacitor in a chip form (length (L)=1.6 mm, width (W)=0.8 mm, thickness (T)=0.2 mm) was prepared where the first buffer layer (TiON), the dielectric layer ($AlO_xN_y$), the second buffer layer (TiON), and the upper electrode (Cu) were formed sequentially on the porous metal base material (aluminum etching foil).

Porous Metal Substrate: Aluminum etching foil for aluminum electrolytic capacitor with a thickness of 120 µm and an expanded surface ratio of approximately 60 times First Buffer Layer: 1 nm TiON film formed by an ALD method Dielectric Layer: 150 nm $AlO_xN_y$ (x is 0.5 or more, y is 0.1 or more) film formed by an ALD method at 350° C.

Second Buffer Layer: 3 nm TiON film formed by an ALD method

Upper Electrode: Cu layer formed by filling pores with Cu in accordance with an electroless plating method Example 4

In the same way as in Example 3 except that the porous metal substrate, the first buffer layer, the dielectric layer, the second buffer layer, and the upper electrode were made to have the following compositions, a film structure as shown in FIG. 2(c), that is, a capacitor in a chip form (length (L)=1.0 mm, width (W)=0.5 mm, thickness (T)=0.15 mm) was prepared where the first buffer layer (Ni), the dielectric layer ($SiO_x$), the second buffer layer (Ni), and the upper electrode (Ni) were formed sequentially on the porous metal base material (aluminum etching foil).

Porous Metal Substrate: Commercially available Ta porous sintered body with an expanded surface ratio of approximately 150 times First Buffer Layer: 10 nm Ni film formed by an ALD method Dielectric Layer: 50 nm $SiO_x$ (x is 1.5 or more) film formed by an ALD method at 200° C.

Second Buffer Layer: 30 nm Ni film formed by an ALD method

Upper Electrode: Ni layer formed by filling pores with Ni in accordance with an electroless plating method Comparative Example 1

Aluminum etching foil was subjected to anodization to form an anodized film as the dielectric layer on the aluminum etching foil, and the step of forming the upper electrode and the subsequent steps were carried out in the same way as in Example 1, thereby preparing a capacitor according to Comparative Example 1. The capacitor according to Comparative Example 1 has the anodized film as the dielectric layer on the surface of the aluminum etching foil, and the upper electrode thereon, without having the first buffer layer.

Comparative Example 2

A capacitor according to Comparative Example 2 was prepared in the same way as in Example 1, except that an $AlO_x$ layer (dielectric layer) was formed by an ALD method directly on aluminum etching foil without forming the first buffer layer.

Comparative Example 3

A capacitor according to Comparative Example 3 was prepared in the same way as in Example 1, except that in place of the first buffer layer, aluminum etching foil was subjected to anodization to form an anodized film on the aluminum etching foil, and that as the dielectric layer, an $AlO_x$ layer was formed thereon by an ALD method. The capacitor according to Comparative Example 3 has the anodized film on the surface of the aluminum etching foil, and the $AlO_x$ layer (dielectric layer) thereon, without having the first buffer layer.

Comparative Example 4

A capacitor according to Comparative Example 4 was prepared in the same way as in Example 1, except that the first buffer layer was formed by a CVD method.

Comparative Example 5

A capacitor according to Comparative Example 5 was prepared in the same way as in Example 1, except that the dielectric layer was formed by a CVD method.

Test Example

Measured were leakage currents produced when a direct-current voltage of 5 V was applied for 120 seconds at room temperature to the capacitors prepared according to Examples 1 to 4 and Comparative Examples 1 to 5. As a result thereof, the capacitors according to Examples 1 to 4 all produced leakage currents of 0.1 mA or less, whereas the capacitors according to Comparative Examples 1 to 5 all produced leakage currents of 10 mA or more.

From the foregoing results, it has been confirmed that Examples 1 and 2 provided with the first buffer layer and Examples 3 and 4 provided with the first buffer layer and the second buffer layer can suppress the leakage current to a tenth part or less of the leakage current in the case of Comparative Examples 1 to 3 without the first buffer layer, Comparative Example 4 with the first buffer layer formed by the CVD method, and Comparative Example 5 with the dielectric layer formed by the CVD method. This is believed to be because the first buffer layer prevented the diffusion of impurities on the porous metal surface into the dielectric layer.

The capacitor according to the present invention is remarkably stable and highly reliable, and thus used for various electronic devices in a preferred manner.

DESCRIPTION OF REFERENCE SYMBOLS capacitor
high-porosity part
low-porosity part
6 porous metal base material
7 first buffer layer
8 dielectric layer
9 second buffer layer
10 upper electrode
12 wiring electrode
14 protective layer
16 first terminal electrode
18 second terminal electrode
20 cut section
22 mask

The invention claimed is:

1. A capacitor comprising:
a porous-metal base material having a central high porosity part and a lateral low porosity party, the high porosity part having a porosity of at least 25%, the low porosity part having a porosity of not more than 60% of the porosity of the high porosity part;
at least one first buffer layer on the porous metal base material;
a dielectric layer on the first buffer layer; and
an upper electrode on the dielectric layer.

2. The capacitor according to claim 1, wherein the first buffer layer comprises one of a metal nitride and a metal oxynitride.

3. The capacitor according to claim 1, wherein the first buffer layer comprises a metal.

4. The capacitor according to claim 1, further comprising a second buffer layer between the dielectric layer and the electrode.

5. The capacitor according to claim 4, wherein at least one of the first buffer layer and the second buffer layer comprises one of a metal nitride and a metal oxynitride.

6. The capacitor according to claim 4, wherein at least one of the first buffer layer and the second buffer layer comprises a metal.

7. The capacitor according to claim 1, further including first and second terminal electrodes.

8. The capacitor according to claim 7, wherein the first terminal electrode is electrically connected to the porous metal base material and the second terminal electrode is electrically connected to the upper electrode.

9. The capacitor according to claim 7, wherein the low porosity part is adjacent at least one of the terminal electrodes.

10. A method for manufacturing a capacitor, the method comprising:
forming at least one first buffer layer on a porous metal base material having a central high porosity part and a lateral low porosity part, the high porosity part having a porosity of at least 25%, the low porosity part having a porosity which is not more than 60% of the porosity of the high porosity part;
forming a dielectric layer on the first buffer layer; and
forming an electrode on the dielectric layer.

11. The method for manufacturing a capacitor according to claim 10, wherein the first buffer layer is formed by an atomic layer deposition method.

12. The method for manufacturing a capacitor according to claim 10, wherein the dielectric layer is formed by an atomic layer deposition method.

13. The method for manufacturing a capacitor according to claim 10, wherein the first buffer layer and the dielectric layer are formed by an atomic layer deposition method.

14. The method for manufacturing a capacitor according to claim 10, wherein the first buffer layer comprises one of a metal nitride and a metal oxynitride.

15. The method for manufacturing a capacitor according to claim 10, wherein the first buffer layer comprises a metal.

16. The method for manufacturing a capacitor according to claim 10, further comprising forming a second buffer layer between the dielectric layer and the electrode.

17. The method for manufacturing a capacitor according to claim 16, wherein the second buffer layer is formed by an atomic layer deposition method.

18. The method for manufacturing a capacitor according to claim 16, wherein the first buffer layer and the second buffer layer are formed by an atomic layer deposition method.

19. The method for manufacturing a capacitor according to claim 16, wherein the first buffer layer, the dielectric layer and the second buffer layer are formed by an atomic layer deposition method.

20. The method for manufacturing a capacitor according to claim 16, wherein at least one of the first buffer layer and the second buffer layer comprises one of a metal nitride and a metal oxynitride.

21. The method for manufacturing a capacitor according to claim 16, wherein at least one of the first buffer layer and the second buffer layer comprises a metal.

* * * * *